United States Patent Office 2,853,385
Patented Sept. 23, 1958

2,853,385
FEED SUPPLEMENTS FOR RUMINANTS

Leslie Frederick Wiggins, Saint Augustine, Trinidad, British West Indies, assignor to Sugar Research Foundation, Inc., New York, N. Y., a corporation of New York, and Southwestern Sugar and Molasses Company, New York, N. Y., a corporation of Texas No Drawing. Application April 12, 1956
Serial No. 577,655
Claims priority, application Great Britain April 21, 1955
1 Claim. (Cl. 99—2)

This invention relates to improved cattle feed produced from ammoniated sugar-containing materials, such as ammoniated molasses. The invention also relates to novel processes for producing the improved cattle feeds and certain nitrogen heterocyclic compounds.

It has been proposed to provide nitrogen-containing feed supplements for ruminants by ammoniating liquid sugar-containing materials, such as molasses (including blackstrap, inverted blackstrap molasses), hydrol syrup, wood-sugar syrup, citrus molasses, condensed distillers molasses solubles, refiners' molasses and the like. These feed supplements are said to provide nitrogen in a form which is assimilated by ruminants and which partially satisfies the protein requirements of the ruminants. The proponents of such feed supplements had great expectations for them since they employ relatively inexpensive agricultural by-products which are in surplus supply and partially supplant the more expensive protein-containing feeds which are in relatively short supply. However, unexpected difficulties have been encountered. It has been found that the ammoniated sugar-containing feed supplements produce toxic results, including hysteria bordering on insanity, in cattle which have been fed with them. These difficulties have prevented the use of substantial quantities of these feed supplements. I have now discovered a means of solving this vexing problem.

It is an object of the present invention to provide improved feed supplements for ruminants which contain ammoniated sugar-containing materials and which are substantially free from the toxic side effects of the prior art ammoniated sugar-containing materials.

It is another object of the present invention to provide processes for treating ammoniated sugar-containing materials to diminish the toxic side effects normally obtained upon employing these materials as a feed supplement for ruminant animals.

It is a further object of the present invention to provide a process for producing certain nitrogen heterocyclic compounds from ammoniated sugar-containing materials to make them available to the chemical industry.

Other objects and advantages of the present invention will be apparent to those skilled in the art from reading the specification which follows.

I have discovered that the toxic side effects produced in cattle when fed ammoniated sugar-containing materials may be eliminated simply by treating these normally alkaline materials (having pH of about 8 to 9) with a non-toxic or food acid until the pH of the aqueous ammoniated product is reduced to between about 3 and 6, and preferably about 4. This addition of the acids to the ammoniated sugar-containing products, such as ammoniated molasses, or an "inverted" or hydrolyzed ammoniated sugar-containing product, not only surprisingly reduces the toxicity of these products but it also increases their palatability to farm animals, particularly the ruminants.

A number of acids may be employed to reduce the pH of these ammoniated products by mixing them with the ammoniated sugar-containing products. Both organic and inorganic acids may be employed. For example, citric acid, phosphoric acid, lactic acid, levulinic acid, the fatty acids, such as acetic, propionic, butyric and mineral acids, such as hydrochloric and sulfuric acids, and those provided by molasses-grass silage, may be added in sufficient quantity to reduce the pH to about 4 or between about 3 and 6.

The present invention is applicable to a variety of ammoniated sugar-containing materials, such as molasses (including blackstrap, inverted blackstrap, and inverted sugar-beet molasses), hydrol syrup, wood-sugar syrup, citrus molasses, condensed distillers molasses solubles, refiners' molasses and the like. The sugar-containing material may be optionally "inverted" or hydrolyzed prior to ammoniation. The treatment with acid to reduce the pH to about 3 to 6 in accordance with the invention will invert any sucrose contained in the ammoniated product.

According to another embodiment of my invention, the ammoniated sugar-containing materials, which may optionally have been inverted or hydrolyzed prior to ammoniation, are extracted with one of a variety of organic solvents which are relatively immiscible in water, such as esters, including ethyl acetate and butyl acetate, alcohols containing more than 3 carbon atoms, such as butyl alcohol, amyl alcohol and fusel oil; ketones, such as methyl isobutyl ketone; halogenated hydrocarbons, such as chloroform and tetrachloroethane; hydrocarbons, such as benzene, or others, such as diethyl ether. The solvent extract is next evaporated to remove the solvent. To separate and recover the components in the residue after evaporating the solvent, the residue is subjected to fractional distillation. The primary components of the residue are the nitrogen heterocyclic compounds, such as the methylpyrazines, including 2:6-dimethylpyrazine and 2-methylpyrazine, hydroxymethylpyrazines and methylimidazoles, such as 4(5)-methylimidazole. The aqueous raffinate remaining after the extraction with the solvent is desirably evaporated to reduce its volume and to recover any solvent dissolved therein. The concentrated raffinate may be employed directly as a feed for ruminants which is substantially free from toxic properties or it may be treated with an acid to reduce the pH to between about 3 and 6 as hereinbefore described to further reduce the toxic properties of the feed and increase its palatability to cattle.

It has been ascertained that among the reaction products obtained when reducing sugars are treated with ammonia at high temperatures are nitrogen heterocycles of the imidazole and pyrazine series. Apparently certain compounds of this type can be toxic to cattle eating a feed containing them. The extraction with a solvent as hereinbefore described removes these toxic materials leaving behind other nitrogenous compounds usually containing hydroxylated side chains which are relatively non-toxic. Moreover, whatever toxic substances remain behind may be reduced by the addition of acidic substances to reduce the pH to about 4 or between 3 and 6 as has been described.

The mechanism by which the treatment with an acid to reduce the pH to between about 3 and 6 effects a reduction of the toxicity of the ammoniated sugar-containing materials is not understood. However, the improvement and freedom from toxicity produced is dramatic.

This invention is particularly applicable to the treatment of aqueous liquid ammoniated sugar-containing materials.

In order more clearly to disclose the nature of the present invention, specific examples illustrating it will

Example 1

To blackstrap molasses (120 parts) was added 20% sulfuric acid (9 parts). The temperature of the mixture was then raised to 95° C. and kept thereat for about an hour, then allowed to cool slightly and neutralized with caustic soda (3 parts). After allowing the mixture to cool to about 50° C. anhydrous ammonia was passed into the space above the molasses mixture which was contained in a stainless steel vessel. Whilst the mixture was vigorously stirred (about 900 R. P. M.) ammonia was rapidly taken up and the temperature of the reaction mass increased spontaneously to about 100°–120° C. During this time little or no positive pressure of ammonia was allowed to build up in the vessel but after the maximum temperature had been achieved, the admission of ammonia was continued under slight pressure until the amount previously calculated to give a product of about 6% nitrogen had been added. Thereafter the mixture was allowed to cool somewhat and discharged into an open vessel, which operation achieved the removal of any excess ammonia. To separate portions of the product were added phosphoric acid, citric acid, acetic acid, lactic acid, so that the pH of each portion of the final material was about 4.

Example 2

To blackstrap molasses contained in a stainless steel reaction vessel and vigorously stirred was added anhydrous ammonia to the gas space above. Ammonia was taken up and the temperature of the mass rose to about 60°–70° C. Heat was applied to increase the temperature to about 120° C. Whilst continuing the admission of ammonia until an amount sufficient to give a product containing 3% nitrogen had been added. After about an hour at 120° C. the reaction mixture was allowed to cool slightly and discharged into an open vessel to release any small amount of surplus ammonia that may be present to atmosphere. Separate portions of the product were treated with the following acids; phosphoric, citric, acetic and lactic acid, to bring the pH of the separate portions to about 4 to provide a cattle food containing both carbohydrate matter and nitrogen substance which the animal can use as a protein source.

Example 3

To blackstrap molasses (120 parts) was added 20% sulfuric acid (9 parts). The temperature of the mixture was then raised to 95° C. and kept thereat for about an hour, then allowed to cool slightly and neutralized with caustic soda (3 parts). After allowing the mixture to cool to about 50° C. anhydrous ammonia was passed into the space above the molasses mixture which was contained in a stainless steel vessel. Whilst the mixture was vigorously stirred (about 900 R. P. M.) ammonia was rapidly taken up and the temperature of the reaction mass increased spontaneously to about 100°–120° C. During this time little or no positive pressure of ammonia was allowed to build up in the vessel but after the maximum temperature had been achieved the admission of ammonia was continued under slight pressure until the amount previously calculated to give a product of about 6% nitrogen had been added. Thereafter the mixture was allowed to cool somewhat and discharged into an open vessel which operation resulted in the removal of any excess ammonia. The product was then transferred to a continuous liquid-liquid extraction apparatus extracted with ethyl acetate which extracted pyrazine and imidazole compounds of small molecular weight from the mixture. When the extraction was complete the extract was evaporated, the solvent recovered and the product subjected to distillation uder reduced pressure. The distillation resolved the extract into 2:6-dimethylpyrazine, hydroxymethylmethylpyrazine, methylpyrazine, and 4(5)-methylimidazole. The aqueous raffinate was evaporated to about 70–80° Brix, any dissolved solvent recovered and separate portions of the residue treated with phosphoric acid, acetic acid, lactic acid or citric acid materials containing any of these acids, until the pH of the final products was about 4. The products were then suitable for use as a feed for ruminant animals.

Example 4

To blackstrap molasses contained in a stainless steel reaction vessel and vigorously stirred was added anhydrous ammonia to the gas space above. Ammonia was taken up and the temperature of the mass rose to about 60°–70° C. Heat was applied to increase the temperature to about 120° C. whilst continuing the admission of ammonia until an amount sufficient to give a product containing 3% nitrogen had been added. After about an hour at 120° C. the reaction mixture was allowed to cool slightly and discharged into an open vessel to release any small amount of surplus ammonia to the atmosphere. The product was then extracted, with or without diluting, with a solvent relatively immiscible with water, such as chloroform, ether, benzene, ethyl acetate or methyl isobutyl ketone which removes small molecular weight pyrazine and imidazole bases from the mixture. After the extraction had been completed, the extract was evaporated to remove the solvent and to obtain the mixed bases which could be separated by fractional distillation if so desired. The aqueous residue from which the small molecular weight pyrazine and imidazole compounds had been removed was evaporated to 70°–80° Brix and separate portions treated with the following acids: phosphoric, citric, acetic and lactic acid, to bring the pH of each portion to about 4 to provide a cattle food containing both carbohydrate matter and nitrogen substance which the animal could use as a protein source.

Example 5

Blackstrap molasses was stored in the presence of invertase until most of the sucrose in the molasses was transformed into invert sugar. The inverted molasses was treated with ammonia and the pH of the ammoniated product adjusted to about 4 with acetic acid in accordance with the procedure described in Example 1.

In place of the blackstrap molasses employed in the foregoing examples, other aqueous syrup materials may be employed, such as: hydrolyzed sugar-beet molasses, hydrol syrup, wood-sugar syrup, citrus molasses or condensed distillers molasses solubles, refiners' molasses, etc.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What is claimed is:

The process of producing a nitrogen-containing feed supplement for ruminants which is substantially free of toxic side effects when eaten by ruminants and which contains nitrogen in a form assimilable by ruminants, which comprises extracting an aqueous ammoniated sugar-containing material with a substantially water-immiscible organic solvent followed by treating the aqueous residue with a non-toxic acid until a pH of between about 3 and 6 is obtained.

References Cited in the file of this patent

UNITED STATES PATENTS

| | | |
|---|---|---|
| 2,197,540 | Klug | Apr. 16, 1940 |
| 2,603,567 | Stiles | July 15, 1952 |
| 2,724,648 | Burdick | Nov. 22, 1955 |